Feb. 7, 1950 — E. F. FISHER — 2,496,281
FLY ASH AND DUST COLLECTOR
Filed July 12, 1944 — 5 Sheets-Sheet 5

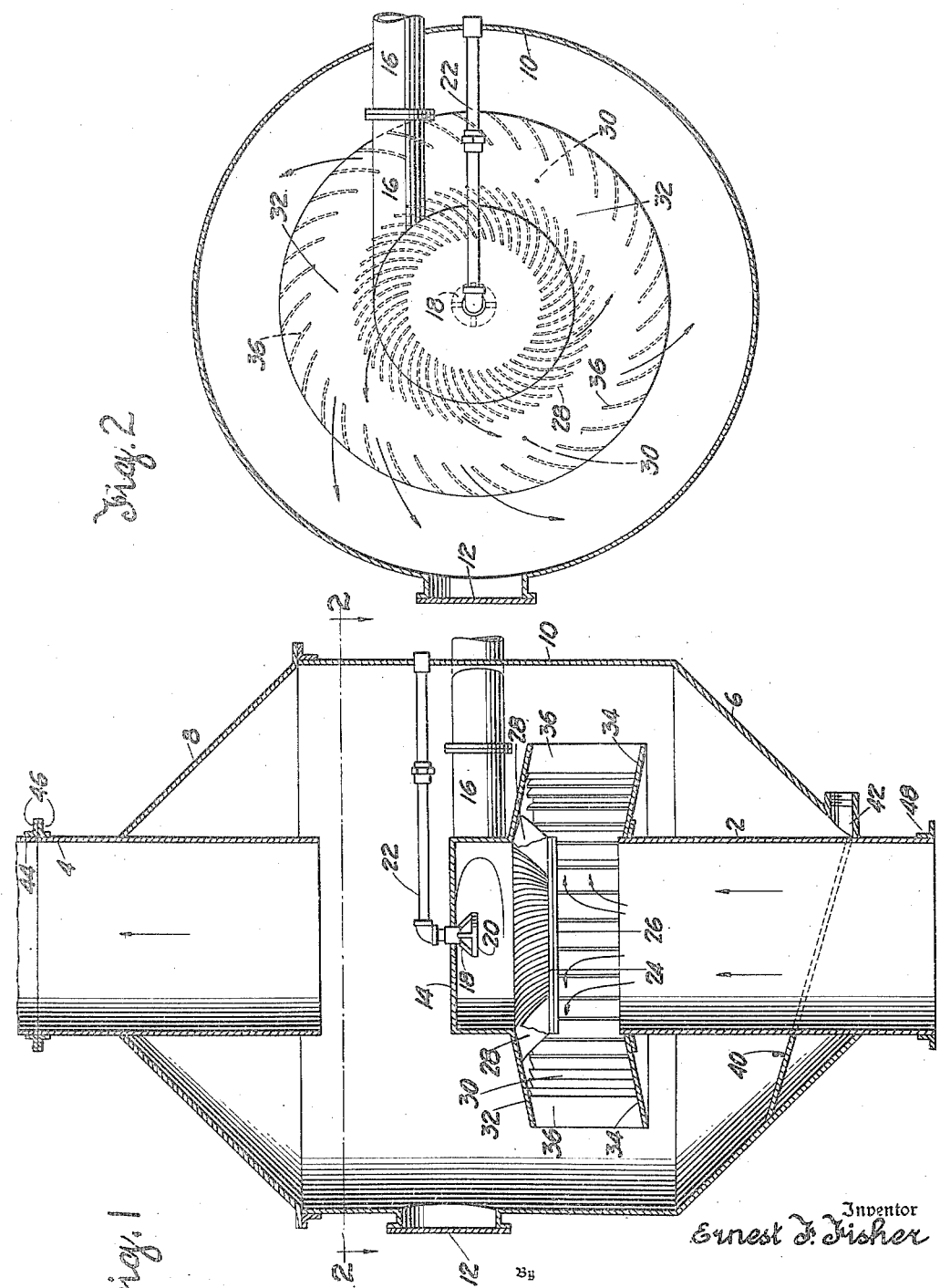

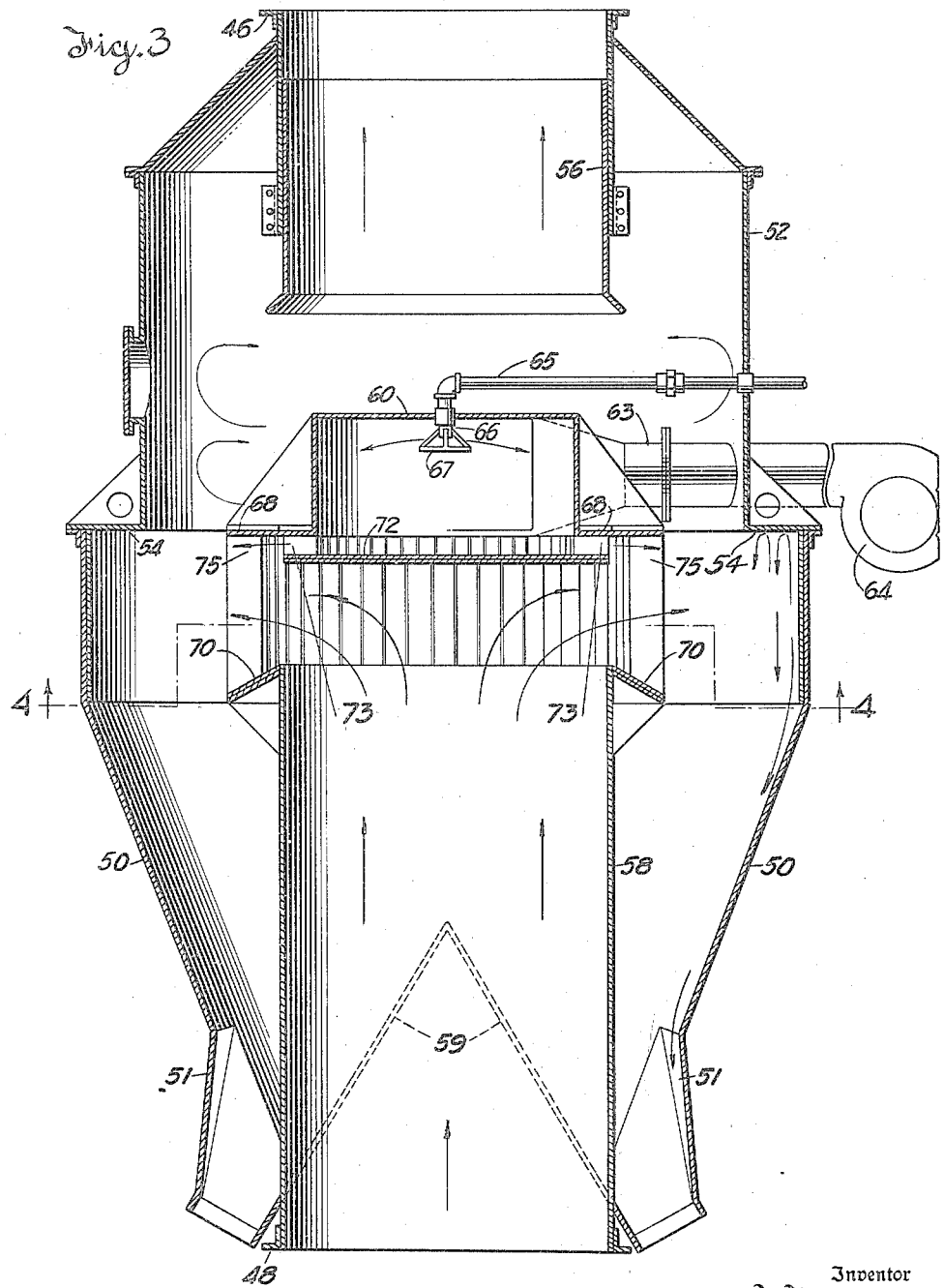

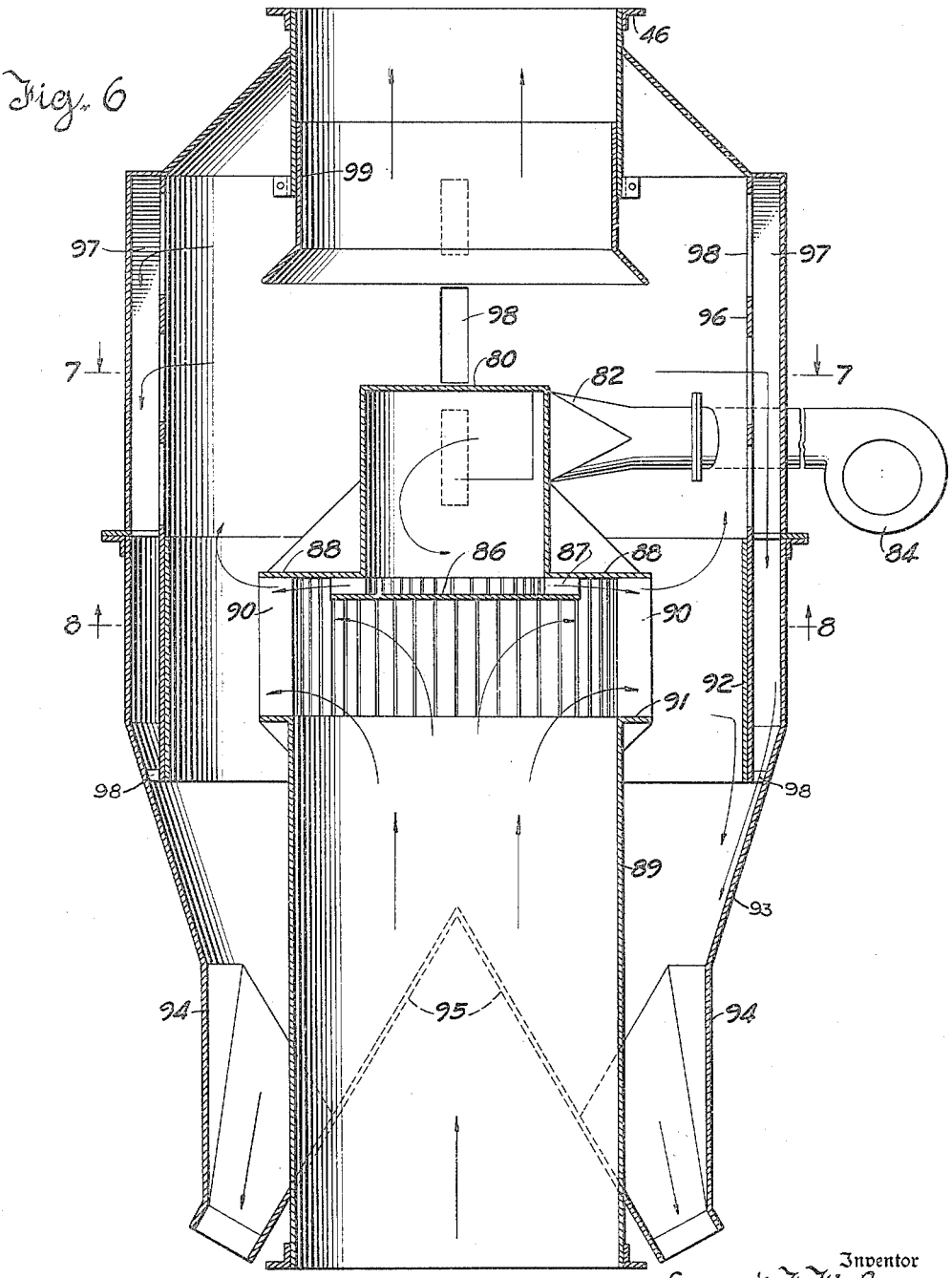

Inventor
Ernest F. Fisher
By Martin T. Fisher, Attorney.

Patented Feb. 7, 1950

2,496,281

UNITED STATES PATENT OFFICE 2,496,281

FLY ASH AND DUST COLLECTOR

Ernest F. Fisher, Harvey, Ill., assignor to Whiting Corporation, Harvey, Ill., a corporation of Illinois Application July 12, 1944, Serial No. 544,554

13 Claims. (Cl. 183—22)

This invention relates to an apparatus for collecting dust, fly ash and the like dust laden gases, such, for example, as furnace and flue gases.

The principal object of the invention is to provide an efficient and reliable dust collecting apparatus wherein the dust laden air is mixed with air, or air and water or other liquid, that is swirling, the mixture then being projected through a second set of swirling vanes, whereby, due primarily to centrifugal force, the dust is thrown against the casing of the apparatus and collected while the clean air and dust free gases flow or pass upwardly and are exhausted.

Another object of the invention is to provide a dust collecting unit or apparatus which may be operated either with or without liquid and is so designed and constructed that it is capable of being readily positioned in a stack or chimney simply by removing a section of the stack or chimney and setting the unit in position in place of the removed section.

Each form of the invention utilizes an air inlet chamber into which air is admitted tangentially, giving such air an initial swirl. If liquid is used, such liquid is sprayed into the air swirling in the inlet chamber, and nebulized further.

Where liquid is used, the air and liquid spray are again swirled by a first set of swirling vanes and are mixed with dust laden air coming up from below, the mixture is then projected into, over and through a second set of swirling vanes. This thoroughly mixes and wets the dust, breaks up agglomerated dust globules and precipitates the dust as sludge. As the wetted dust leaves the second set of swirling vanes, it is whirling rapidly, and due to centrifugal force, the wetted dust is thrown outwardly against the inner surface of the side wall of the casing and is washed down as sludge to a sludge outlet.

Where no liquid is used, the whirling action is as described above; the heavier dust particles are thrown against the casing and fall by gravity to the bottom of the casing; lighter dust particles, still whirling, pass into segregated, inwardly opening vertical channels and are collected therein and fall downwardly therein to a dust outlet.

More specifically, the present invention comprises an open bottom air inlet chamber, to which air is supplied under pressure by a tangential inlet, such inlet giving an initial swirl to the air. If liquid is used, it is sprayed into the air in this inlet chamber. Below the open bottom of this chamber is a deflector for deflecting air or air and spray from the inlet chamber, outwardly. A plurality of angularly placed deflecting vanes is preferably positioned around the outer edge of the deflector, for giving a second swirl to the air, or air and liquid, if liquid is used.

Below the deflector is a vertically positioned open ended conduit for the inlet from below of dust laden air. This conduit directs the dust laden air toward the under side of the deflector which deflects it outwardly.

Positioned outwardly beyond the first set of swirling vanes is a second set of swirling vanes whereby the clean air and liquid that are outwardly deflected by the top surface of the deflector, and the dust laden gases that are outwardly deflected by the under surface of the deflector are thoroughly mixed together and given an additional or third swirl as they leave these vanes.

As the dust, air and gases leave the outer set of vanes they are swirling rapidly and the heavier dust particles and liquid are thrown outwardly by centrifugal force against the inner surface of the casing, and pass downwardly by gravity to an appropriate dust or sludge outlet.

Where the term "dust laden air" is used, it should be understood that such term covers flue gases and combustion gases, as well as dust laden air from other operations. Air delivered by a blower is considered as outside or relatively clean air.

The main features of the invention having been thus outlined, the invention will be more specifically described in connection with the accompanying drawings, wherein:

Fig. 1 is a vertical, sectional view through one form of the dust collector of the present invention;

Fig. 2 is a horizontal section of the line 2—2 of Fig. 1;

Fig. 3 is a vertical section through another form of the invention;

Figure 8:
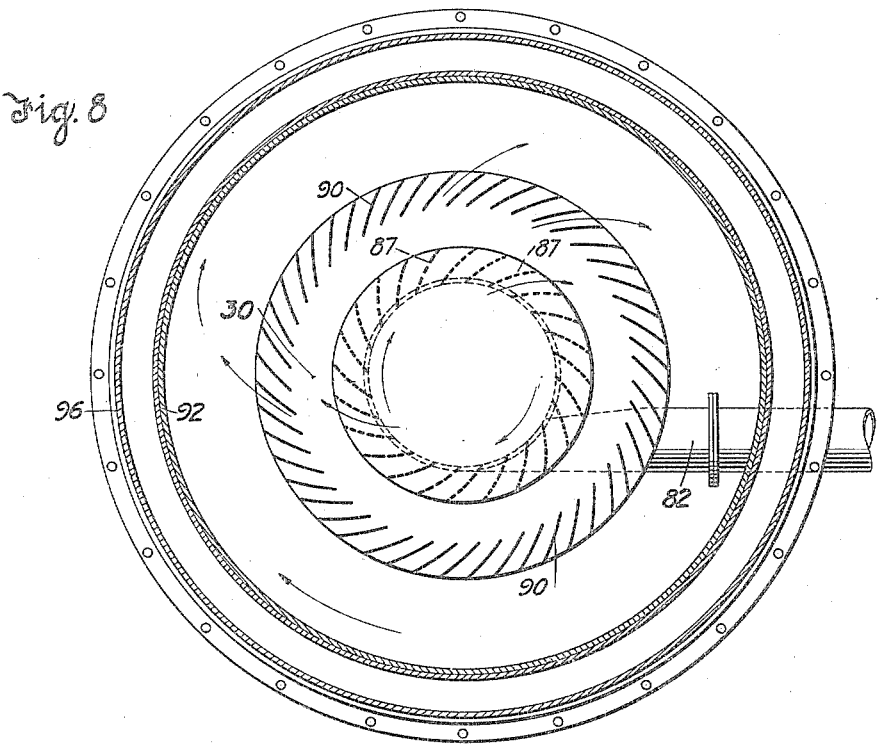
Figure 7:
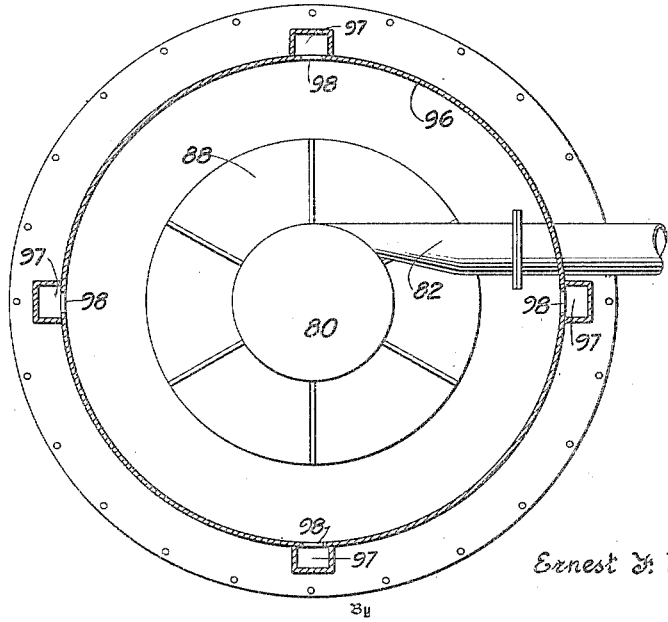

Fig. 6 is a sectional view of a dust collector which does not utilize liquid; and Figs. 7 and 8 are sectional views on the lines 7—7 and 8—8, respectively, of Fig. 6, looking in the direction of the arrows, Fig. 7 being slightly reduced in size.

In Figs. 1 and 2, 2 is a vertically positioned open-ended lower conduit, for the admission of dust-laden air or gas. 4 is a similar open-ended conduit for the exit of washed gas. These conduits are structurally united with a larger casing comprising lower and upper frusto-conical oppositely arranged walls 6 and 8, the small ends of which are connected respectively to conduits 2 and 4. The casing also comprises connecting cylindrical vertical wall 10 and this extends between, and is connected to the large ends of, the side walls 6 and 8 and is provided with a manhole cover 12.

The inner unit of the collector of Figures 1 and 2 is positioned on the upper end of the conduit 2 and comprises an inverted cup-shaped, open-bottomed air inlet chamber 14 to which air under pressure is supplied through a tangential air inlet pipe 16 from a suitable blower. The air inlet chamber 14 whirls around on account of the tangential supply. A spray of water or other suitable liquid is sprayed laterally into the air whirling in chamber 14, by a suitable spray device 18, which may include a spreader 20. Water under pressure is supplied to the spray device 18 by pipe 22.

Positioned below inlet chamber 14 and a substantial distance above the upper end of conduit 2, is a circular deflector 24, which may be backed up and reinforced by a liner plate 26. As shown in Figure 1, the diameter of the deflector 24 is substantially the same as that of conduit 2 and the side wall of the air inlet chamber 14.

Positioned between the outer margin of deflector 24 and the lower edge of chamber 14 is an annular series of angularly positioned swirling vanes 28. The spaces between the several vanes 28 form an exit from chamber 14 for the whirling air and water, and the vanes 28 give a strong additional swirl to the air and water and project such air and water into a passageway 30. Such passageway 30 is formed by an upper, annular, outwardly and downwardly extending plate 32 and a lower, annular, outwardly and downwardly extending plate 34 and is in communication both with the water spray and air leaving chamber 14 through vanes 28, as well as in communication with the upper end of the open-ended conduit 2. Positioned between the outer portions of the plates 32 and 34 is a second annular series of vertical and angularly positioned swirling vanes 36.

In operation, the dust laden air and gas traveling upwardly in the conduit 2 are deflected by the lower surface of the deflector 24 outwardly into the vortex of water and air deflected by the upper surface of the deflector, through the first set of vanes 28, and by virtue of the swirling or vertical action of the air and spray, leaving the vanes 28, the dust laden gases are given a strong initial swirl and are thoroughly mixed with and wetted by the water spray, and are then projected into and through and over the second set of swirling vanes 36, leaving such vanes with a very strong whirling motion, due to the combined effect of the swirl from chamber 14 and vanes 28, plus the additional swirl imparted by swirling vanes 36. The swirling action that is attributed to the vanes 36 projects the heavier particles of dust, sludge and water against the inner surface of the casing wall 10, the dust by this time being a sludge which is washed down on the inside of the wall 10 and onto the lower frusto-conical wall 6. The water spray and down wash over the vanes 36 keep the latter clear of accumulated dust.

Surrounding the conduit 2 and intersecting the wall 6 is a flat downwardly inclined sludge-collecting plate 40, which guides the sludge and water to the sludge removal exit 42.

The gas washing unit or collector as described above may be readily set in place in a conduit 44, such as a stack or the like, through which dust laden gases are passing, by removing a section of the conduit and setting the described washing unit of this invention in place of the removed section. Angle bars or the like 46 and 48 serve fixedly to secure the unit in place.

Figure 4:
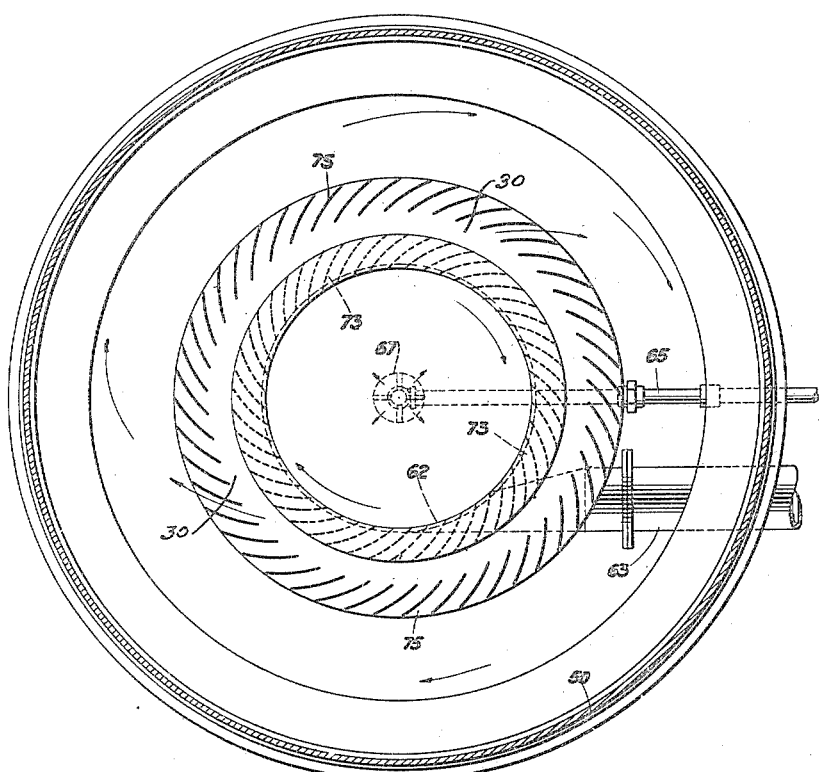
Fig. 4 is a section taken on the line 4—4 of Fig. 3 looking upwardly.
Figure 5:
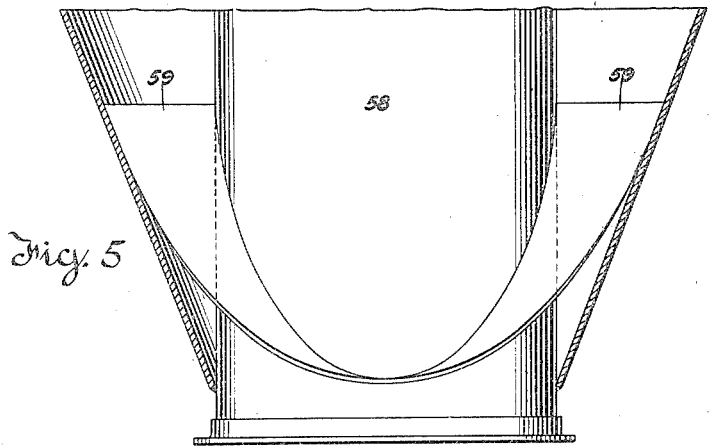
Fig. 5 is a view partly in section of the lower part of the dust collector shown in Figs. 3 and 4.

In the form of invention shown in Figs. 3, 4 and 5, the dust collector comprises a lower casing 50 with converging walls, merging into a pair of diagonally opposite sludge discharge outlets 51. Casing 50 is connected to an upper casing 52, the latter being somewhat smaller than the upper part of 50, to form a dust blocking, inset shoulder or baffle 54, to be described more fully below. At the upper end of casing 52 is a tubular outlet 56 for the clean air and gases.

Vertically positioned in casing 50 is a large open-end conduit 58. Two flat downwardly and oppositely inclined partitions 59 fit around the outside of the conduit 58 collect and serve to guide the sludge to sludge outlets 51.

Suitably positioned in the casing, well above the upper end of conduit 58, is a circular, open-bottomed air inlet and swirling chamber 60, supplied with air under pressure through tangential inlet 62 from a pipe 63 connected to a blower 64. Water or other liquid under any desired pressure from a pipe 65 is sprayed into the air swirling in chamber 60 by any suitable type of spray head or nozzle 66 which may include a deflecting plate 67.

Extending outwardly from the lower edge of chamber 60 is an annular plate 68 and extending outwardly from the upper edge of conduit 58 is an inclined annular plate 70.

A deflector 72 is centrally positioned, a short distance below chamber 60 and well above the upper end of conduit 58. Positioned between the outer part of the deflector and the inner part of plate 68 is a first set or annular series of angularly positioned swirling vanes 73, for whirling air and liquid spray as they leave the inlet chamber.

Positioned between the outer marginal portions of annular plates 68 and 70 is a second and taller set or annular series of angularly positioned whirling vanes 75, set at an angle similar to the angle of the first set of vanes 73. Between vanes 73 and 75 is a mixing space like the space 30 of the collector of Figs. 1 and 2.

The operation is as follows: Dust laden air, fly ash or the like, passes upwardly in conduit 58 and is deflected laterally and outwardly by the bottom surface of the deflector toward the outer or second set of vanes 75. Air entering inlet chamber 60 is whirled around therein by reason of the tangential inlet, and liquid spray from the spray head 66 is projected into such whirling air and thoroughly mixed therewith and further nebulized. This mixture of air and atomized liquid is deflected by the upper surface of deflector 72, and passes outwardly through swirling vanes 73, the whirling being accentuated by vanes 75 and creating a cyclonic swirl in the space just outside the vanes 73. The whirling mixture of liquid and air leaving vanes 73 is projected into the dust laden air being deflected laterally and outwardly by the bottom surface of deflector 72 and is mixed with such dust laden air and gives such dust laden air an initial swirl. The swirling mixture of air, liquid and dust is projected into, through and against the second set of vanes 75. The latter aid in the disintegration of dust particles and in the mixing of dust and liquid and are kept wet by the liquid in atomized or spray form. The steady spray and down wash of liquid over the vanes 75 washes off any adhering dust as sludge and the latter falls into the sludge outlets 51.

As the wetted dust leaves vanes 75, it is given an additional swirl by such vanes and the heavier dust and sludge are projected against the casing wall, below inlet shoulder 54 and pass down to the sludge outlets. Any unprecipitated dust that might tend to pass upwardly is deflected back by inset shoulder 54 into the swirling mixture of air and water passing out through vanes 75 and is precipitated as sludge. The cleaned air passes up and out of the outlet 56.

Structures similar to those shown in Figs. 1–5, which utilize a liquid or water spray in the air inlet chambers, can be operated without a water or liquid spray. However, where no liquid spray is used, the structure shown in Figs. 6, 7 and 8 is preferably used, and these figures will now be described.

Referring now to Figs. 6 to 8, an open-bottomed air inlet chamber 80 is supplied with air under pressure by a pipe 82 opening into the upper part of the chamber and connected to a blower 84. Positioned a short distance below the open bottom of chamber 80 is a deflector 86 which deflects air outwardly through a first set or annular series of angularly positioned swirling vanes 87 positioned between the outer part of deflector 86 and the inner part of an annular plate 88 extending outwards from the lower edge of the chamber 80.

A vertically positioned open-ended tube 89 for the inlet of dust laden air directs such air upwardly against the under side of deflector 86, and the latter deflects such air outwardly into the whirling clean air leaving vanes 87, giving an initial swirl to the dust laden air. The dust laden air and the air from the inlet chamber then passes into and through a second set or annular series of angularly positioned swirling vanes 90. The latter are positioned between the outer part of plate 88 and a flange 91 at the upper edge of conduit 89, and serve to give an additional swirl to the air mixture.

As the air and dust leave the vanes 90, it is swirling rapidly and the heavier dust particles are thrown by centrifugal force against wall 92 of the casing and then drop into the lower part of casing 93 and into dust outlets 94. Two flat downwardly and oppositely inclined partitions 95 cooperate with the outside of conduit 89 in such manner as to guide the collected dust to the dust outlets.

As in the other forms, there is a space between the two sets of swirling vanes, in which some mixing occurs before the dust and gases enter vanes 90.

The upper part 96 of the casing is provided with vertically extending channels or pockets 97 which communicate through vertically elongated restricted openings or slots 98 with the interior of the upper part of the casing. The lighter dust, or fly ash particularly, that is not heavy enough to have dropped through the lower part of the casing, passes into the upper part 96 of the casing while it is still swirling and, due to centrifugal force, follows around the interior of the casing and passes through the several slots 98 into the vertical channels 97, in which it descends by gravity to a point 98 below the upper end of conduit 89, from whence it falls into the dust outlets 94. Cleaned air passes upwardly through a clean air outlet 99. A baffle or deflecting shoulder-like baffle 54 of the Fig. 3 collector could be used with this form of the invention, if desired.

While the several embodiments of the invention have been described in some detail, it should be understood that this description is illustrative, rather than restrictive, of the invention, and that it can be carried out in other ways.

I claim as my invention:

1. A collector of the character described comprising a vertically extending tubular conduit adapted to have dust laden gas flow upwards therethrough, a vertically elongated casing of materially greater maximum width than the conduit, having the lower end thereof extending around the conduit and connected to the latter at a point beneath the upper end thereof and its upper end provided with an outlet, an inverted cup shaped member disposed within the central portion of the casing and above and in alignment with the conduit, provided with an open bottom, and embodying a top wall and a continuous side wall depending from the top wall and defining therewith an air chamber, a pipe extending into the casing, having the inner end thereof leading through, and extending tangentially with respect to, the side wall of said member and its outer end adapted for connection to a source of clean air under pressure, and serving to introduce the clean air under pressure into the air chamber so that it is caused to swirl therein, a horizontally disposed deflector plate positioned between, and in spaced relation with, the open bottom of the member and the upper end of the conduit and adapted to cause the dust laden gas emanating from said conduit and the swirling clean air under pressure emanating from said open bottom of the member to be deflected outwards towards the casing and in such manner that they mix together, and a continuous series of vertical angularly positioned vanes extending between the margin of the deflector plate and the lower end of the side wall of the member and arranged so as to augment swirling of the clean air under pressure as it flows outwards from the deflector plate preparatory to mixing with the dust laden gas.

2. A collector of the character described comprising a vertically extending cylindrical conduit adapted to have dust laden gas flow upwards therethrough, a vertically elongated casing of circular cross section and greater maximum diameter than the conduit, having the lower end thereof downwardly tapered, extending around the conduit, connected to the latter at a point beneath the upper end thereof and provided with a discharge for collected matter, and having its upper end provided with an upwardly facing main outlet, an inverted cup shaped member disposed within the central portion of the casing and above and in alignment with the conduit, provided with an open bottom, and embodying a top wall and an annular side wall depending from the top wall and defining therewith an air chamber, a horizontal pipe extending transversely through the central portion of the casing, having the inner end thereof leading through, and extending tangentially with respect to, the side wall of said member and its outer end adapted for connection to a source of clean air under pressure, and serving to introduce the clean air under pressure into the air chamber so that it is caused to swirl therein, a circular horizontally disposed deflector plate positioned between, and in spaced relation with, the open bottom of the member and the upper end of the conduit and adapted to cause the dust laden gas emanating from said conduit and the swirling clean air under pressure emanating from said open bottom of the member to be deflected outwards towards the casing and in such manner that they mix together, and an annular series of vertical angularly positioned vanes extending between the margin of the deflector plate and the lower end of the side wall of the member and arranged so as to augment swirling of the clean air under pressure as it flows outwards from the deflector plate preparatory to mixing with the dust laden gas.

3. A collector of the character described comprising a vertically extending cylindrical conduit adapted to have dust laden gas flow upwards therethrough, a vertically elongated casing of materially greater maximum width than the conduit, having the lower end thereof extending around the conduit, connected to the latter at a point beneath the upper end thereof and provided with a discharge for collected material, and having its upper end provided with a main outlet, an inverted cup shaped member disposed within the central portion of the casing and above and in alignment with the conduit, provided with an open bottom, and embodying a top wall and an annular side wall depending from the top wall, defining therewith an air chamber and provided on the lower end thereof with an outwardly extending annular flange, a pipe extending through the casing, having the inner end thereof leading through, and extending tangentially with respect to, the side wall of said member and its outer end adapted for connection to a source of clean air under pressure, and serving to introduce the clean air under pressure into the air chamber so that it is caused to swirl therein, a circular horizontally disposed deflector plate positioned between, and in spaced relation with, the open bottom of the member and the upper end of the conduit and adapted to cause the dust laden gas emanating from said conduit and the swirling clean air under pressure emanating from said open bottom of the member to be deflected outwards towards the casing and in such manner that they mix together, and an annular series of vertical angularly positioned vanes extending between the margin of the deflector plate and the aforesaid annular flange and arranged so as to augment swirling of the clean air under pressure as it flows outwards from the deflector plate preparatory to mixing with the dust laden gas.

4. A collector of the character described comprising a vertically extending tubular conduit adapted to have dust laden gas flow upwards therethrough, a vertically elongated casing of materially greater maximum width than the conduit, having the lower end thereof extending around the conduit, connected to the latter at a point beneath the upper end thereof and provided with a sludge discharge, and having its upper end provided with a main outlet, an inverted cup shaped member disposed within the central portion of the casing and above and in alignment with the conduit, provided with an open bottom, and embodying a top wall and a continuous side wall depending from the top wall and defining therewith an air chamber, a pipe extending into the casing, having the inner end thereof leading through, and extending tangentially with respect to, the side wall of said member and its outer end adapted for connection to a source of clean air under pressure, and serving to introduce the clean air under pressure into the air chamber so that it is caused to swirl therein, means for spraying a liquid into the air chamber for admixture with the swirling clean air, a horizontally disposed deflector plate positioned between, and in spaced relation with, the open bottom of the member and the upper end of the conduit and adapted to cause the dust laden gas emanating from said conduit and the swirling liquid containing clean air under pressure emanating from said open bottom of the member to be deflected outwards towards the casing and in such manner that they mix together, and a continuous series of vertical angularly positioned vanes extending between the margin of the deflector plate and the lower end of the side wall of the member and arranged so as to augment swirling of said liquid containing clean air under pressure as it flows outwards from the deflector plate preparatory to mixing with the dust laden gas.

5. A collector of the character described comprising a vertically extending cylindrical conduit adapted to have dust laden gas flow upwards therethrough, a vertically elongated casing of greater maximum width than the conduit, having the lower end thereof extending around the conduit, connected to the latter at a point beneath the upper end thereof and provided with a discharge for collected material, and having its upper end provided with a main outlet, an inverted cup shaped member disposed within the central portion of the casing and above and in alignment with the conduit, provided with an open bottom, and embodying a top wall and an annular side wall depending from the top wall and defining therewith an air chamber, a pipe extending through the casing, having the inner end thereof leading through, and extending tangentially with respect to, the side wall of said member and its outer end adapted for connection to a source of clean air under pressure, and serving to introduce the clean air under pressure into the air chamber so that it is caused to swirl therein, a circular horizontally disposed deflector plate positioned between, and in spaced relation with, the open bottom of the member and the upper end of the conduit and adapted to cause the dust laden gas emanating from said conduit and the swirling clean air under pressure emanating from said open bottom of the member to be deflected outwards towards the casing and in such manner that they mix together, an annular series of vertical angularly positioned vanes extending between the margin of the deflector plate and the lower end of the side wall of the member and arranged so as to augment swirling of the clean air under pressure as it flows outwards from the deflector plate preparatory to mixing with the dust laden gas, and a second annular series of vertical angularly positioned vanes surrounding and spaced outwards from the first mentioned vanes, and serving to effect swirling of the mixture of air and gas as it flows outwards towards the casing.

6. A collector of the character described comprising a vertically extending cylindrical conduit adapted to have dust laden gas flow upwards therethrough and embodying at its upper end an annular outwardly extending flange, a vertically elongated casing of greater maximum width than the conduit, having the lower end thereof extending around the conduit, connected to the latter at a point beneath the upper end thereof and provided with a discharge for collected material, and having its upper end provided with a main outlet, an inverted cup shaped member disposed within the central portion of the casing and above and in alignment with the conduit, provided with an open bottom, and embodying a top wall and an annular side wall depending from the top wall, defining therewith an air chamber and provided at its lower end with an annular outwardly extending flange, a pipe extending through the casing, having the inner end thereof leading through, and extending tangentially with respect to, the side wall of said member and its outer end adapted for connection to a source of clean air under pressure, and serving to introduce the clean air under pressure into the air chamber so that it is caused to swirl therein, a circular horizontally disposed deflector plate positioned between, and in spaced relation with, the open bottom of the member and the upper end of the conduit and adapted to cause the dust laden gas emanating from said conduit and the swirling clean air under pressure emanating from said open bottom of the member to be deflected outwards towards the casing and in such manner that they mix together, an annular series of vertical angularly positioned vanes extending between the margin of the deflector plate and the inner margin of the flange on the lower end of the side wall of the member and arranged so as to augment swirling of the clean air under pressure as it flows outwards from the deflector plate preparatory to mixing with the dust laden gas, and a second annular series of vertical angularly positioned vanes surrounding and spaced outwards from the first mentioned vanes, extending between and connected to the outer margins of said flanges and serving to effect swirling of the mixture of air and gas as it flows outwards towards the casing.

7. A collector of the character described comprising a vertically extending cylindrical conduit adapted to have dust laden gas flow upwards therethrough, a vertically elongated casing of circular cross section and greater maximum diameter than the conduit, having the lower end thereof downwardly tapered, extending around the conduit, connected to the latter at a point beneath the upper end thereof, and provided with a sludge discharge, and having its upper end provided with an upwardly facing main outlet, an inverted cup-shaped member disposed within the central portion of the casing and above and in alignment with the conduit, provided with an open bottom, and embodying a top wall and an annular side wall depending from the top wall, defining therewith an air chamber and provided at the lower end thereof with an outwardly extending annular flange, a pipe extending into the casing, having the inner end thereof leading through, and extending tangentially with respect to, the side wall of said member and its outer end adapted for connection to a source of clean air under pressure, and serving to introduce clean air under pressure into the chamber so that it is caused to swirl therein, means for spraying a liquid into the air chamber for admixture with the swirling clean air, a circular, horizontally disposed deflector plate positioned between, and in spaced relation with, the open bottom of the member and the upper end of the conduit and adapted to cause the dust laden gas emanating from said conduit and the swirling liquid containing clean air under pressure emanating from said open bottom of the member to be deflected outwards towards the casing and in such manner that they mix together, and an annular series of vertical angularly positioned vanes extending between the margin of the deflector plate and the aforesaid annular flange and arranged so as to augment swirling of said liquid containing clean air under pressure as it flows outwards from the deflector plate preparatory to mixing with the dust laden gas.

8. A collector of the character described comprising a vertically extending cylindrical conduit adapted to have dust laden gas flow upwards therethrough, a vertically extending conduit of circular cross section positioned an appreciable distance above, and in concentric relation with, the first mentioned conduit and serving as a main outlet, a vertically elongated casing of circular cross section and greater maximum diameter than either conduit, having the lower end thereof downwardly tapered, extending around said first mentioned conduit, connected to the latter at a point beneath the upper end thereof, and provided with a discharge for collected matter, and having its upper end extending around the second mentioned conduit and connected to the latter at a point above the lower end thereof, an inverted cup shaped member disposed within the central portion of the casing and between and in alignment with the two conduits, provided with an open bottom, and embodying a top wall and an annular side wall depending from the top wall and defining therewith an air chamber, a pipe extending through the casing, having the inner end thereof leading through, and extending tangentially with respect to, the side wall of said member and its outer end adapted for connection to a source of clean air under pressure, and serving to introduce the clean air under pressure into the air chamber so that it is caused to swirl therein, a circular horizontally disposed deflector plate positioned between, and in spaced relation with, the open bottom of the member and the upper end of the first mentioned conduit and adapted to cause the dust laden gas emanating from said first mentioned conduit and the swirling clean air under pressure emanating from said open bottom of the member to be deflected outwards towards the casing and in such manner that they mix together, and an annular series of vertical angularly positioned vanes extending between the margin of the deflector plate and the lower end of the side wall of the member and arranged so as to augment swirling of the clean air under pressure as it flows outwards from the deflector plate preparatory to mixing with the dust laden gas.

9. A collector of the character described comprising a vertically extending cylindrical conduit adapted to have dust laden gas flow upwards therethrough, a vertically elongated casing of circular cross section and greater maximum diameter than the conduit, having the lower end thereof downwardly tapered, extending around the conduit, connected to the latter at a point beneath the upper end thereof and provided at its lower extremity with a pair of diametrically opposite downwardly extending discharges and having its upper end provided with a main outlet, means in the central portion of the casing for introducing into the dust laden gas emanating from the conduit outwardly swirling clean air under pressure in order to precipitate the dust in the gas and cause the dust to impinge against the central portion of the casing from whence it falls by gravity toward the downwardly tapered lower end of the casing, and a pair of downwardly and oppositely inclined substantially flat U-shaped partitions fitting between the conduit and the tapered lower end of the casing, having the upper end portions thereof joined together, and arranged and adapted to direct the downwardly falling dust to said discharges.

10. A collector of the character described comprising a vertically extending cylindrical conduit adapted to have dust laden gas flow upwards therethrough, a vertically elongated casing of circular cross section and greater maximum diameter than the conduit, having the lower end thereof extending around the conduit, connected to the latter at a point beneath the upper end thereof and provided with a discharge for collected matter, and having its upper end provided with an upwardly facing main outlet, an inverted cup shaped member disposed within the central portion of the casing and above and in alignment with the conduit, provided with an open bottom, and embodying a top wall and an annular side wall depending from the top wall and defining therewith an air chamber, a pipe extending through the casing, having the inner end thereof leading through, and extending tangentially with respect to, the side wall of said member and its outer end adapted for connection to a source of clean air under pressure, and serving to introduce the clean air under pressure into the air chamber so that it is caused to swirl therein, a circular horizontally disposed deflector plate positioned between, and in spaced relation with, the open bottom of the member and the upper end of the conduit and adapted to cause the dust laden gas emanating from said conduit and the swirling clean air under pressure emanating from said open bottom of the member to be deflected outwards towards the casing and in such manner that they mix together, and an annular series of vertical angularly positioned vanes extending between the margin of the deflector plate and the lower end of the side wall of the member and arranged so as to augment swirling of the clean air under pressure as it flows outwards from the deflector plate preparatory to mixing with the dust laden gas, the central portion of said casing being provided at a point above said vanes with a horizontally disposed in-set annular baffle for deflecting downwards toward the casing bottom the free dust in the mixture of gas and air.

11. A collector of the character described comprising a vertically extending cylindrical conduit adapted to have dust laden air blow upwards therethrough, a vertically elongated casing of circular cross section and greater diameter than the conduit, having the lower end thereof downwardly tapered, extending around the conduit, connected to the latter at a point beneath the upper end thereof, and provided with a discharge for collected matter, and having its upper end provided with an upwardly facing main outlet, means in the central portion of the casing for introducing into the dust laden gas emanating from the conduit outwardly swirling clean air under pressure in order to precipitate the dust in the gas and cause the dust to impinge against the central portion of the casing from whence it falls by gravity toward the downwardly tapered lower end of the casing, the central portion of said casing being provided at a point above the vanes with a horizontally disposed in-set annular baffle for deflecting downwards any free dust tending to flow upwards with the mixture of gas and air to the outlet.

12. A collector of the character described comprising a vertically extending cylindrical conduit adapted to have dust laden gas flow upwards therethrough, a vertically elongated casing of circular cross section and greater maximum diameter than the conduit, having the lower end thereof extending around the conduit, connected to the latter at a point beneath the upper end thereof and provided with a discharge for collected matter, and having its upper end provided with an upwardly facing main outlet, an inverted cup shaped member disposed within the central portion of the casing and above and in alignment with the conduit, provided with an open bottom, and embodying a top wall and an annular side wall depending from the top wall and defining therewith an air chamber, a pipe extending through the casing, having the inner end thereof leading through, and extending tangentially with respect to, the side wall of said member and its outer end adapted for connection to a source of clean air under pressure, and serving to introduce the clean air under pressure into the air chamber so that it is caused to swirl therein, a circular horizontally disposed deflector plate positioned between, and in spaced relation with, the open bottom of the member and the upper end of the conduit and adapted to cause the dust laden gas emanating from said conduit and the swirling clean air under pressure emanating from said open bottom of the member to be deflected outwards towards the casing and in such manner that they mix together, and an annular series of vertical angularly positioned vanes extending between the margin of the deflector plate and the lower end of the side wall of the member and arranged so as to augment swirling of the clean air under pressure as it flows outwards from the deflector plate preparatory to mixing with the dust laden gas, said casing being provided with spaced apart vertically extending interiorly disposed baffles for collecting dust from the mixture of air and gas and guiding the collected dust to said lower end of the casing.

13. A collector of the character described comprising a vertically extending cylindrical conduit adapted to have dust laden air blow upwards therethrough, a vertically elongated casing of circular cross section and greater diameter than the conduit, having the lower end thereof downwardly tapered, extending around the conduit, connected to the latter at a point beneath the upper end thereof, and provided with a discharge for collected matter, and having its upper end provided with an upwardly facing main outlet, means in the central portion of the casing for introducing into the dust laden gas emanating from the conduit outwardly swirling clean air under pressure in order to precipitate the dust in the gas and cause the dust to impinge against the central portion of the casing from whence it falls by gravity toward the downwardly tapered lower end of the casing, said casing being provided with spaced apart vertically extending interiorly disposed channels for collecting dust from the mixture of air and gas and guiding the collected dust to the tapered lower end of the casing.

ERNEST F. FISHER.

REFERENCES CITED

The following references are of record in the file of this patent:

UNITED STATES PATENTS

| Number | Name | Date |
|---|---|---|
| 1,038,707 | Yeomans | Sept. 17, 1912 |
| 1,501,876 | Wreesmann | July 15, 1924 |
| 1,570,577 | Romero et al. | Jan. 19, 1926 |
| 1,582,550 | Seymour | Apr. 27, 1926 |
| 1,604,769 | Fox | Oct. 26, 1926 |
| 1,726,828 | Hawley | Sept. 3, 1929 |
| 1,734,677 | Kreisinger | Nov. 5, 1929 |
| 1,815,406 | Hutchison | July 21, 1931 |
| 1,939,248 | Bennett | Dec. 12, 1933 |
| 1,939,949 | Bertram | Dec. 19, 1933 |
| 2,171,574 | Lambert et al. | Sept. 5, 1939 |
| 2,197,595 | Schneible | Apr. 16, 1940 |
| 2,259,033 | Fisher | Oct. 14, 1941 |

FOREIGN PATENTS

| Number | Country | Date |
|---|---|---|
| 317,166 | Great Britain | Aug. 15, 1929 |